(12) United States Patent
McKee

(10) Patent No.: US 6,745,307 B2
(45) Date of Patent: Jun. 1, 2004

(54) METHOD AND SYSTEM FOR PRIVILEGE-LEVEL-ACCESS TO MEMORY WITHIN A COMPUTER

(75) Inventor: Bret McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 10/001,075

(22) Filed: Oct. 31, 2001

(65) Prior Publication Data
US 2003/0084256 A1 May 1, 2003

(51) Int. Cl.⁷ .............................................. G06F 12/00
(52) U.S. Cl. ....................................... 711/163; 711/164
(58) Field of Search ................................... 711/163, 164

(56) References Cited

U.S. PATENT DOCUMENTS

| | | | | |
|---|---|---|---|---|
| 5,809,546 A | * | 9/1998 | Greenstein et al. | ......... 711/164 |
| 5,900,019 A | * | 5/1999 | Greenstein et al. | ......... 711/164 |
| 6,694,457 B2 | * | 2/2004 | McKee | .......................... 714/38 |
| 2002/0129299 A1 | * | 9/2002 | McKee | .......................... 714/38 |
| 2002/0194389 A1 | * | 12/2002 | Worley et al. | ............... 709/310 |
| 2003/0115476 A1 | * | 6/2003 | McKee | ......................... 713/193 |

* cited by examiner

Primary Examiner—Reba I. Elmore

(57) ABSTRACT

Method and system for controlling areas of memory within a computer system to routines executing at a specific privilege levels in a modern computer architecture featuring protection keys, operating-system-routine calls and interrupts result in promotion of the current privilege level to the highest privilege level prior to dispatch to an operating system routine with concomitant demotion of the CPL Current Privilege Level to operating-system-privilege level. By partitioning the 24-bit protection queue space into multiple protection-key domains, each protection-key domain associated with a privilege level, and by invalidating protection-key registers during each protection of the current privilege level to a higher privilege level, regions of memory are provided that can only be accessed by routines running at low privilege levels and by routines at the highest privilege level, but not accessible to routines running at intermediate privilege levels.

18 Claims, 11 Drawing Sheets

| TLB.AR | TLB.PL | PRIVILEGE LEVEL 3 | 2 | 1 | 0 | DESCRIPTION |
|---|---|---|---|---|---|---|
| 0 | 3 | R | R | R | R | READ ONLY |
| | 2 | | R | R | R | 710 |
| | 1 | | | R | R | |
| | 0 | | | | R | |
| 1 | 3 | RX | RX | RX | RX | READ, EXECUTE |
| | 2 | | RX | RX | RX | |
| | 1 | | | RX | RX | |
| | 0 | | | | RX | |
| 2 | 3 | RW | RW | RW | RW | READ, WRITE |
| | 2 | | RW | RW | RW | |
| | 1 | | | RW | RW | |
| | 0 | | | | RW | |
| 3 | 3 | RWX | RWX | RWX | RWX | READ, WRITE, EXECUTE |
| | 2 | | RWX | RWX | RWX | |
| | 1 | | | RWX | RWX | |
| | 0 | | | | RWX | |
| 4 | 3 | R | RW | RW | RW | READ ONLY/READ, WRITE |
| | 2 | | R | RW | RW | |
| | 1 | | | R | RW | |
| | 0 | | | | RW | |
| 5 | 3 | RX | RX | RX | RWX | READ, EXECUTE/READ, WRITE, EXEC |
| | 2 | | RX | RX | RWX | |
| | 1 | | | RX | RWX | |
| | 0 | | | | RWX | |
| 6 | 3 | RWX | RW | RW | RW | READ, WRITE, EXECUTE/READ, WRITE |
| | 2 | | RWX | RW | RW | |
| | 1 | | | RWX | RW | |
| | 0 | | | | RW | |
| 7 | 3 | X | X | X | RX | EXEC, PROMOTE/READ, EXECUTE |
| | 2 | XP2 | X | X | RX | |
| | 1 | XP1 | XP1 | X | RX | |
| | 0 | XP0 | XP0 | XP0 | RX | |

Fig. 10

METHOD AND SYSTEM FOR PRIVILEGE-LEVEL-ACCESS TO MEMORY WITHIN A COMPUTER

TECHNICAL FIELD

The present invention relates to computer architecture and data security within computer systems and, in particular, to a method and system for providing, to processes operating at certain selected privilege levels, access to a memory region while preventing processes operating at other privilege levels from accessing the memory region.

BACKGROUND OF THE INVENTION

The present invention is related to security and access privileges within a computer system that allow processes executing at certain privilege levels to access a region of memory while preventing processes executing at other privilege levels from accessing the memory region. The topics of computer architecture and memory security are far too complex to summarize comprehensively in this section. Instead, a simplified, but adequate, background is presented in this section as a basis for presenting a detailed description of several embodiments of the claimed invention in a subsequent section.

FIG. 1 is a block diagram showing hardware, operating-system, and application-program layers within a generalized computer system. A computer system 100 can be considered to comprise a hardware layer 102, an operating system layer 104, and an application-programming layer 106. Computer systems are quite complex, with many additional components, sub-layers, and logical entity interrelationships, but the 3-layer hierarchy shown in FIG. 1 represents a logical view of computer systems commonly employed within the computer software and hardware industries.

The hardware layer 102 comprises the physical components of a computer system. These physical components include, for many small computer systems, a processor 108, memory storage components 110, 112, and 114, internal buses and signal lines 116–119, bus interconnect devices 120 and 122, and various microprocessor-based peripheral interface cards 124–129. The processor 108 is an instruction-execution device that executes a stream of instructions obtained by the processor from internal memory components 110, 112, and 114. The processor contains a small number of memory storage components referred to as registers 130 that can be quickly accessed. Data and instructions are read from, and written to, the memory components 110, 112, and 114 via internal buses 116 and 117 and the bus interconnect device 120. Far greater data storage capacity resides in peripheral data storage devices such as disk drives, CD-ROM drives, DVD drives, and other such components that are accessed by the processor via internal buses 116, 118, and 119, interconnect devices 120 and 122, and one or more of the peripheral device interconnect cards 124–129. For example, the stored instructions of a large program may reside on a disk drive for retrieval and storage in internal memory components 110, 112, and 114 on an as-needed basis during execution of the program. More sophisticated computers may include multiple processors with correspondingly more complex internal bus interconnections and additional components.

The operating system layer 104 is a logical layer comprising various software routines that execute on the processor 108 or one or more of a set of processors and that manage the physical components of the computer system. Certain operating system routines, in a traditional computer system, run at higher priority then user-level application programs, coordinating concurrent execution of many application programs and providing each application program with a run-time environment that includes processor time, a region of memory addressed by an address space provided to the application program, and a variety of data input and output services, including access to memory components, peripheral devices, communications media, and other internal and external devices. Currently running programs are executed in the context of a process, a logical entity defined by various state variables and data structures managed by the operating system. One important internal data structure managed by the operating system is a process queue 132 that contains, for each currently active process, a process-control block or similar data structure that stores data that defines the state of the currently active process managed by the operating system.

The application-programming and user interface layer 106 is the user-visible layer of the computer system. The current invention relates primarily to the application program interface as well as to internal kernel and operating-system interfaces, and thus the application-programming and user interface layer will be discussed primarily with reference to the application program interface. An application program comprises a long set of stored instructions 134, a memory region addressed within an address space provided by the operating system to the process executing the application program 136, and a variety of services 138–142 provided through the operating-system interface that allow the application program to store data to, and retrieve data from, external devices, access system information, such as an internal clock and system configuration information, and to access additional services.

FIG. 2 illustrates the concept of privilege within a traditional computer system, such as the computer system diagrammed in FIG. 1. A privilege level is a value contained within a process-status control register of a processor within the hardware layer of the computer system. Many current computer systems employ two privilege levels: (1) a most privileged level, or kernel-privilege level; and (2) a less privileged level, or application-program privilege level. In computer systems providing two privilege levels, the current privilege level ("CPL") for a currently executing process can be represented by a single CPL bit within the process status register. When the CPL bit has the value "0," the currently executing process executes at kernel-privilege level, and when the CPL bit has a value of "1," the currently executing process executes at application-privilege level. The privilege level at which a process executes determines the total range or ranges of virtual memory that the process can access and the range of instructions within the total instruction set that can be executed by the processor on behalf of the process. In FIG. 2, the area within outer circle 202 represents the resources accessible by a processor executing at kernel-privilege level, privilege level 0, and the area within the inner circle 204 represents resources accessible by a process executing at application-privilege level, privilege level 1. In FIG. 2, the left-hand rectangle 206 represents the entire instruction set provided by the processor architecture, and right-hand rectangle 208 represents the entire range of addressable virtual memory that can be accessed by a routine executing at the most privileged level. A process executing with privilege level 0 (202 in FIG. 2) can access the entire instruction set 206 and the entire addressable virtual memory 208 of the computer system. However, a process executing at privilege level 2 (204 in FIG. 2) can access only a portion of the instruction set 210 (represented by the cross-hatched region of the entire instruction set 206) and only a portion 212 of the entire addressable memory 208.

The privilege concept is used to prevent full access to computing resources by application programs. In order to obtain services that employ resources not directly available to application programs, application programs need to call operating system routines through the operating system interface. Operating system routines can promote the CPL to privilege level 0 in order to access the necessary resources, carry out a task requested by an application program, and then return control to the application program while simultaneously demoting the CPL back to privilege level 1. By restricting application-program access to computer resources, an operating system can maintain operating-system-only-accessible data structures for managing many different, concurrently executing programs, in the case of a single-processor computer, and, on a multi-processor computing system, many different concurrently executing application programs, a number of which execute in parallel. Privilege levels also prevent the processor from executing certain privileged instructions on behalf of application programs. For example, instructions that alter the contents of the process status register may be privileged, and may be executed by the processor only on behalf of an operating system routine running at privilege level 0. Generally, restricted instructions include instructions that manipulate the contents of control registers and special operating-system-specific data structures.

As an example of the use of privilege levels, consider concurrent execution of multiple processes, representing multiple application programs managed by the operating system in a single-processor computer system. The processor can execute instructions on behalf of only a single process at a time. The operating system may continuously schedule concurrently executing processes for brief periods of execution in order to provide, over time, a fraction of the total processing bandwidth of the computer system to each running application program. The operating system schedules a process for execution by removing the process-control block corresponding to the process from the process queue and writing the contents of various memory locations within the process-control block into various control registers and operating-system data structures. Similarly, the operating system removes a process from the executing state by storing the contents of control registers and operating-system data structures into the corresponding process-control block and re-queuing the process-control block to the process queue. Operating system routines are invoked through system calls, faults, traps, and interrupts during the course of execution of an application program. By maintaining the process queue in memory accessible only to routines executing at privilege level 0, and by ensuring that some or all instructions required to store and retrieve data from control registers are privilege level 0 instructions, the architecture of the computing system ensures that only operating-system routines can schedule application processes for execution. Thus, an application program may not manipulate the process queue and control registers in order to monopolize system resources and prevent other application programs from obtaining computing resources for concurrent execution.

The operating system, as part of providing an application programming environment, provides both application-specific and application-sharable memory to application programs. An application program may store private data that the application wishes to be inaccessible to other application programs in private memory regions, and may exchange data with other application programs by storing date in sharable memory. Access to memory is controlled by the operating system through address mapping and access privileges associated with memory pages, each memory page generally comprising some fixed number of 8-bit bytes. Because the instructions and operating-system data structures necessary for memory mapping and access privilege assignment include instructions and memory accessible only to routines executing at privilege level 0, an application program executing at privilege level 1 may not remap memory or reassign access privileges in order to gain access to the private memory of other application programs. The operating system routines that control memory mapping and access-privilege assignment protect one application program's private memory from that of other application programs. As one example, an application program executing on behalf of one user may store data-encryption keys within private memory that allow the user to access confidential user-information via the Internet, including user-account information. By controlling access to memory and instructions via privilege levels, the computer system ensures that only trusted operating system routines and one application program can maintain the data encryption keys in memory private to the application program, so that application programs running on behalf of other users may not access the first user's data encryption keys in order to access the first user's account information. Unfortunately, most currently available operating systems are not verifiably secure, and contain security holes and breaches that may allow knowledgeable and malicious users to access private memory allocated to other users.

FIG. 3 shows logical layers that may intercooperate within a modern, 4-privilege-level computer system. In FIG. 3, the hardware level 302, operating system level 304, and application-programming level 306, are equivalent to the corresponding hardware, operating-system, and application program levels 102, 104, and 106 in the traditional computing system shown in FIG. 1. The 4-privilege-level computer system may also include two additional levels 308 and 310 between the hardware level 302 and the operating system level 304. The first logical level at these additional levels 308 represents certain fundamental, highly-privileged kernel routines that operate at privilege level 0. The second logical layer 310 represents a control-program level that includes various relatively highly privileged service routines that run at privilege level 1. The operating system level 304 includes operating system routines that run at privilege level 2. Application programs, in the 4-privilege-level computer system, run at privilege 3, the least privileged level. The highly-privileged kernel routines that together compose logical layer 308 may be designed to be verifiably correct and provide critical services, including encryption services, that require fully secure management. An application program, for example, running at privilege 3, may call a kernel routine that runs at privilege 0 in order to obtain data encryption keys that the application program can use to encrypt and decrypt sensitive data. While the routines of that run at privilege level 0 may be designed to be 308 verifiably correct, and fully secure, the operating system routines that run in the operating system level at privilege level 2 are not verifiably correct and are not fully secure. Thus, in order to guarantee data encryption key security at the application level, the application program must be able to obtain private memory that can be accessed only by itself and by routines of the secure kernel 308, but that cannot be accessed by routines that run at intervening privilege levels 1 and 2.

FIG. 4 illustrates partitioning of memory resources between privilege levels in a four-privilege-level computer system. Memory resources accessible to routines running at privilege level 0 are represented by the area within the outer circle 402 in FIG. 4. Memory resources accessible to routines running at privilege levels 1, 2, and 3 are represented by the areas within circles 404, 406, and 408, respectively. The total accessible memory is represented by rectangle 410. As shown in FIG. 4, a process running at privilege level 3 can only access a subset 412 of the total memory space. However, an operating-system routine operating at privilege level 2 can access memory accessible by an application program running at privilege 3 as well as additional memory 414–415 accessible to routines running at privilege levels 2–0. In similar fashion, a routine running at privilege level 1 can access memory accessible to routines running at privilege levels 3 and 2, as well as additional memory 416–417 accessible only to processes running at privilege levels 1 and 0. Finally, a routine running at privilege level 0 can access the entire memory space within the computer system.

In view of the nested accessibility of memory to routines running at the various privilege levels, as illustrated in FIG. 4, it is not possible, by privilege level alone, to provide memory to an application program that is accessible by both the application program and by routines running at privilege level 0. Instead, memory accessible to a routine running at privilege level 3 is generally accessible to routines running at privilege levels 2, 1, and 0. Thus, private memory provided to an application program can also be accessed by operating system routines. However, because operating systems are generally far too complex to be computationally verified and generally include security holes that can be exploited by malicious users to breach security policies adopted by the operating system, it is not possible, using privilege levels alone, to ensure security of private memory accessible to application routines running at privilege level 3. For these reasons, computer architects, software developers, Internet retailers, and computer users have all recognized the need for a method and system for providing memory accessible only to routines executing at arbitrary subsets of privilege levels, particularly at privilege levels 0 and 3.

SUMMARY OF THE INVENTION

The present invention is related to computer architecture and secure memory access within computer systems. Certain modern computer architectures provide multiple privilege levels at which processors may execute and which control access to memory pages. Generally, memory and instructions accessible at a lower privilege level are also accessible to processes running at one or more higher privilege levels. It is therefore not possible, using privilege levels alone, to provide memory accessible to a low privilege process and to a high privilege process, but not accessible to intermediate-level processes.

In certain modern computer architectures, memory is protected not only by privilege-level-based access rights, but also by protection keys. In certain modern computer architectures, a number of protection-key registers are included in the control registers accessible to routines running at the most privileged level. Memory pages are associated with 24-bit protection keys. An executing process may access a memory page if a valid protection key equal to the protection key associated with the memory page is currently contained within a protection-key register, if the privilege level associated with the memory page is less privileged or equally privileged to the privilege level of the currently executed process and, finally, if the access mode attempted by the currently executed process is compatible with access mode associated with the memory page and contained within the protection-key register. In certain modern computer architectures featuring protection keys, operating-system routine calls, interrupts, traps, and faults result in promotion of the current privilege level to the highest privilege privilege level prior to dispatch by a kernel routine to an operating system routine with concomitant demotion of the current privilege level to operating-system-privilege level. Any promotion of the current privilege level in such systems occurs via an initial promotion to the most privileged privilege level. By partitioning the 24-bit protection key space into multiple protection-key domains, each protection-key domain associated with a privilege level, by associating memory pages with protection keys selected from the protection-key domain corresponding to the privilege level associated with the memory page, and by invalidating protection-key registers during promotion of the current privilege level to a higher privilege level, it is possible to provide regions of memory that can only be accessed by routines running at low privilege levels and by routines running at the highest privilege level, but not accessible to routines running at intermediate privilege levels.

BRIEF DESCRIPTION OF THE DRAWINGS

FIG. 10 illustrates partitioning of the protection key space into four protection-key domains.

DETAILED DESCRIPTION OF THE INVENTION

One embodiment of the present invention provides a method and system for memory access control within a computer system that allows a routine running at the highest privilege level and a routine running at the lowest privilege level within a multi-privilege-level architecture to both access a memory region while preventing intermediate-privilege-level routines from accessing the memory region. This, in turn, allows provision of an application-level program with private memory inaccessible to the operating system that manages execution of the application program. Only the application program and routines of a high-privilege-level kernel layer that is verifiably secure can access this memory region, closing any potential security holes and breaches within the operating system by which access to the memory region might otherwise be obtained.

Figure 5:
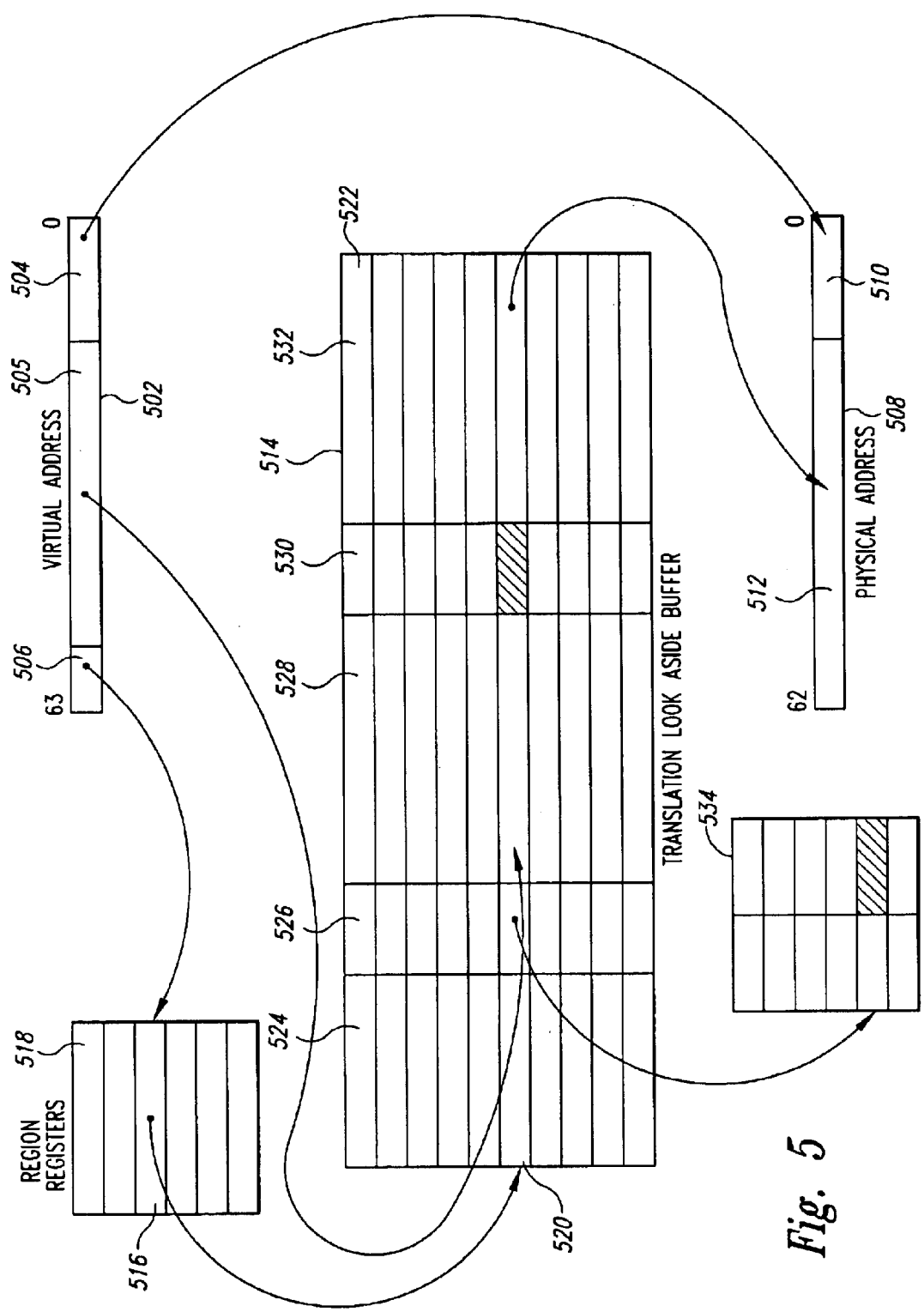
FIG. 5 illustrates translation of a virtual memory address into a physical memory address via information stored within region registers, protection-key registers, and a translation look-aside buffer.

FIG. 5 illustrates translation of a virtual memory address into a physical memory address via information stored within region registers, protection-key registers, and a translation look-aside buffer ("TLB"). In certain modern computer architectures, such as the Intel® IA-64 architecture, virtual addresses are 64-bit computer words, represented in FIG. 5 by a 64-bit quantity 502 divided into three fields 504–406. The first two fields 504 and 505 have sizes that depend on the size of a memory page, which can be adjusted within a range of memory page sizes. The first field 504 is referred to as the "offset." The offset is an integer designating a byte within a memory page. If, for example, a memory page contains 4096 bytes, then the offset needs to contain 12 bits to represent the values 0–4095 in the binary number system. The second field 505 contains a virtual page address. The virtual page address designates a memory page within a virtual address space that is mapped to physical memory, and further backed up by memory pages stored on mass storage devices, such as disks. The third field 506 is a three-bit field that designates a region register containing the identifier of a region of memory in which the virtual memory page specified by the virtual page address 505 is contained.

Translation of the virtual memory address 502 to a physical memory address 508 that includes the same offset 510 as the offset 504 in the virtual memory address, as well as a physical page number 512 that references a page in the physical memory components of the computer system, is carried out by the processor, at times in combination with operating system routines. If a translation from a virtual memory address to a physical memory address is contained within the TLB 514, then the virtual-memory-address-to-physical-memory-address translation can be entirely carried out by the processor without operating system intervention. The processor employs the region register selector field 506 to select a register 516 within a set of region registers 518. The selected region register 516 contains a region identifier. The processor uses the region identifier contained in the selected region register and the virtual page address 505 together in a hash function to select a TLB entry 520. Alternatively, the TLB can be searched for an entry containing a region identifier and virtual memory address that match the region identifier contained in the selected region register 516 and the virtual page address 505. Each TLB entry, such as TLB entry 522, contains fields that include a region identifier 524, a protection key associated with the memory page described by the TLB entry 526, a virtual page address 528, privilege and access mode fields that together compose an access rights field 530, and a physical memory page address 532.

If an entry in the TLB can be found that contains the region identifier contained within the region register specified by the region register selector field of the virtual memory address, and that contains the virtual page address specified within the virtual memory address, then the processor determines whether the virtual memory page described by the virtual memory address can be accessed by the currently executing process. The currently executing process may access the memory page if the access rights within the TLB entry allow the memory page to be accessed by the currently executing process and if the protection key within the TLB entry can be found within the protection-key registers 534 in association with an access mode that allows the currently executing process access to the memory page. The access rights contained within a TLB entry include a 3-bit access mode field that indicates one, of a combination of, read, right, and execute privileges, and a 2-bit privilege level field that specifies the privilege level required of an accessing process. Each protection-key register contains a protection key associated with an access mode field specifying allowed access modes and a valid bit indicating whether or not the protection-key register is currently valid. Thus, in order to access a memory page described by a TLB entry, the accessing process must access the page in a manner compatible with the access mode associated with a valid protection key within the protection-key registers and associated with the memory page in the TLB entry and must be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB fault occurs and an operating system routine is invoked in order to find the specified memory page within physical memory or, if necessary, load the specified memory page from an external device into physical memory, and then insert the proper translation as an entry into the TLB. If, upon attempting to translate a central memory address to a physical memory address, the process does not find a valid protection key within the protection-key registers 534, or if the attempted access by the currently executing process is not compatible with the access mode in the TLB entry or associated with the protection key in the protection-key register, or the privilege level at which the currently executing process executes is less than the privilege level associated with the TLB entry or protection key, then a fault occurs that is handled by a kernel routine that dispatches execution to an operating system routine.

Figure 6:
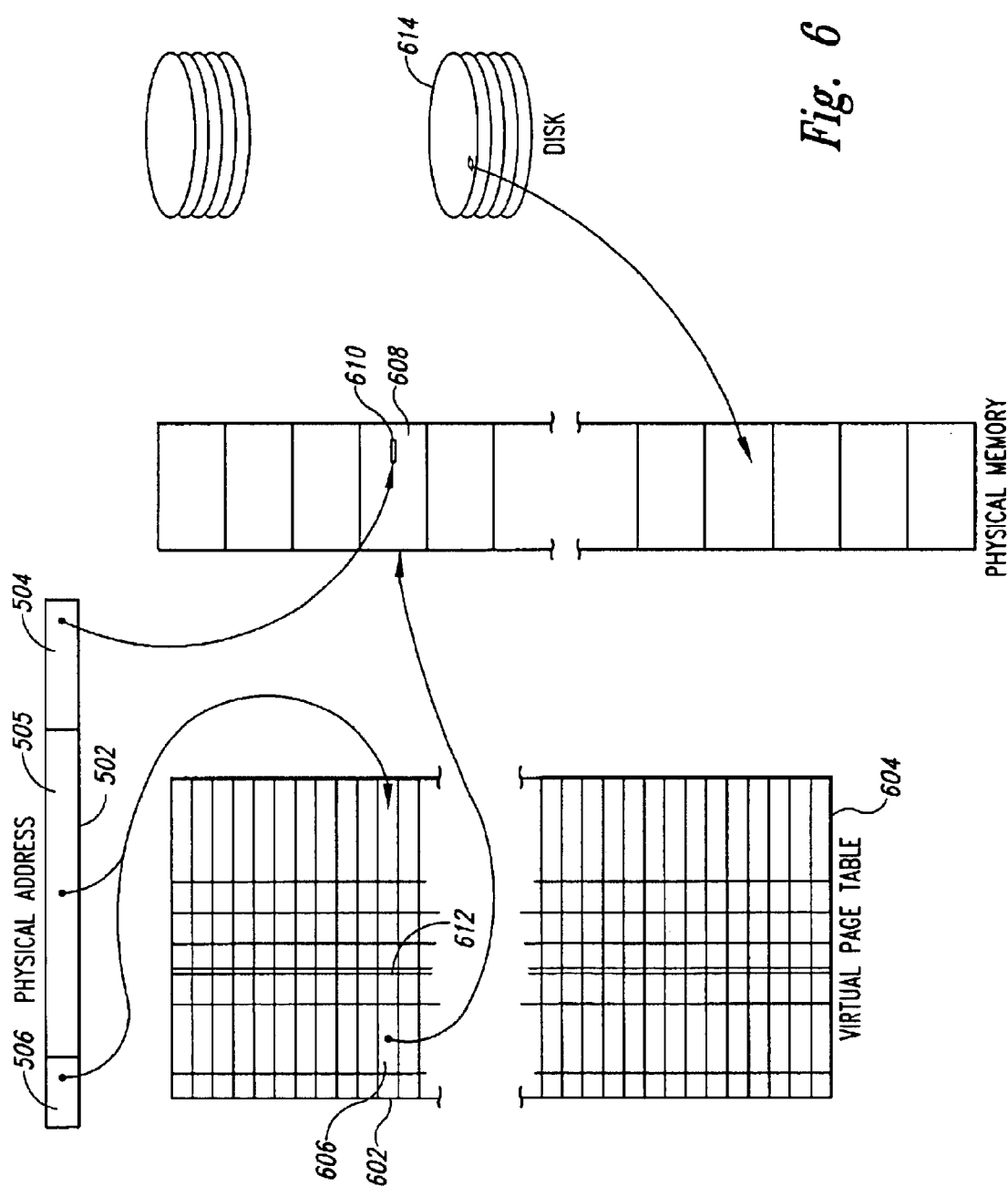
FIG. 6 shows the data structures employed by an operating system routine to find a memory page in physical memory corresponding to a virtual memory address.

FIG. 6 shows the data structures employed by an operating system routine to find a memory page in physical memory corresponding to a virtual memory address. The virtual memory address 502 is shown in FIG. 6 with the same fields and numerical labels as in FIG. 5. The operating system routine employs the region selector field 506 and the virtual page address 505 to select an entry 602 within a virtual page table 604 via a hash function. The virtual page table entry 602 includes a physical page address 606 that references a page 608 in physical memory. The offset 504 of the virtual memory address is used to select the appropriate byte 610 in the virtual memory page 608. In some architectures, memory is byte addressable, while in others the finest addressable granularity may be a 16-bit, 32-bit, 64-bit, or 128-bit word. The virtual page table 602 includes a bit field 612 indicating whether or not the physical address is valid. If the physical address is not valid, then the operating system selects a memory page within physical memory to contain the memory page, and retrieves the contents of the memory page from an external storage device, such as a disk drive 614. The virtual page table entry 602 contains additional fields from which the information required for a TLB entry can be retrieved. If the operating system successfully translates the virtual memory address into a physical memory address, that translation, both as a virtual page table entry and as a TLB entry, is inserted into the TLB.

Figure 1:
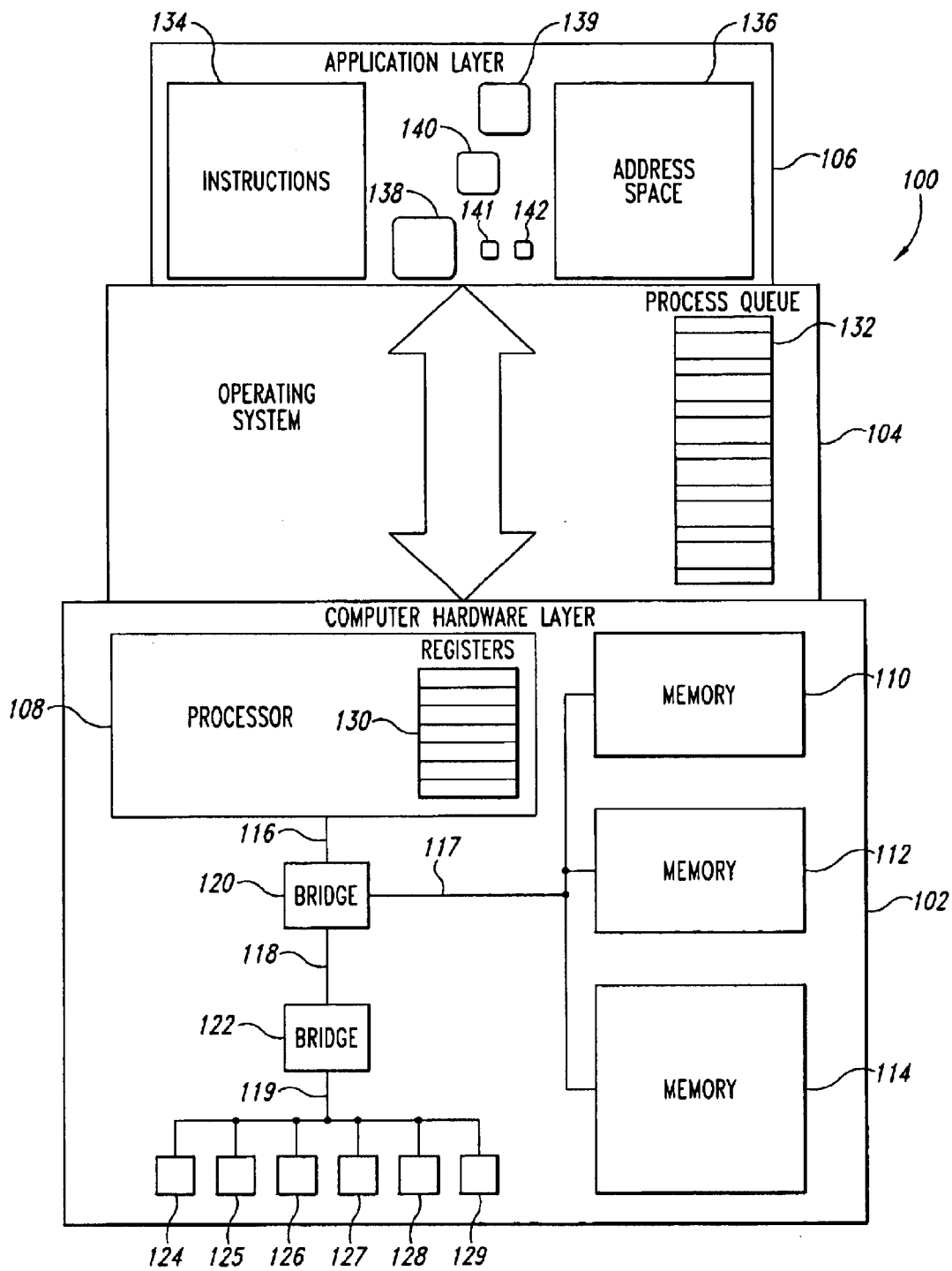
FIG. 1 is a block diagram showing hardware, operating-system and application-program layers within a generalized computer system.
Figure 2:
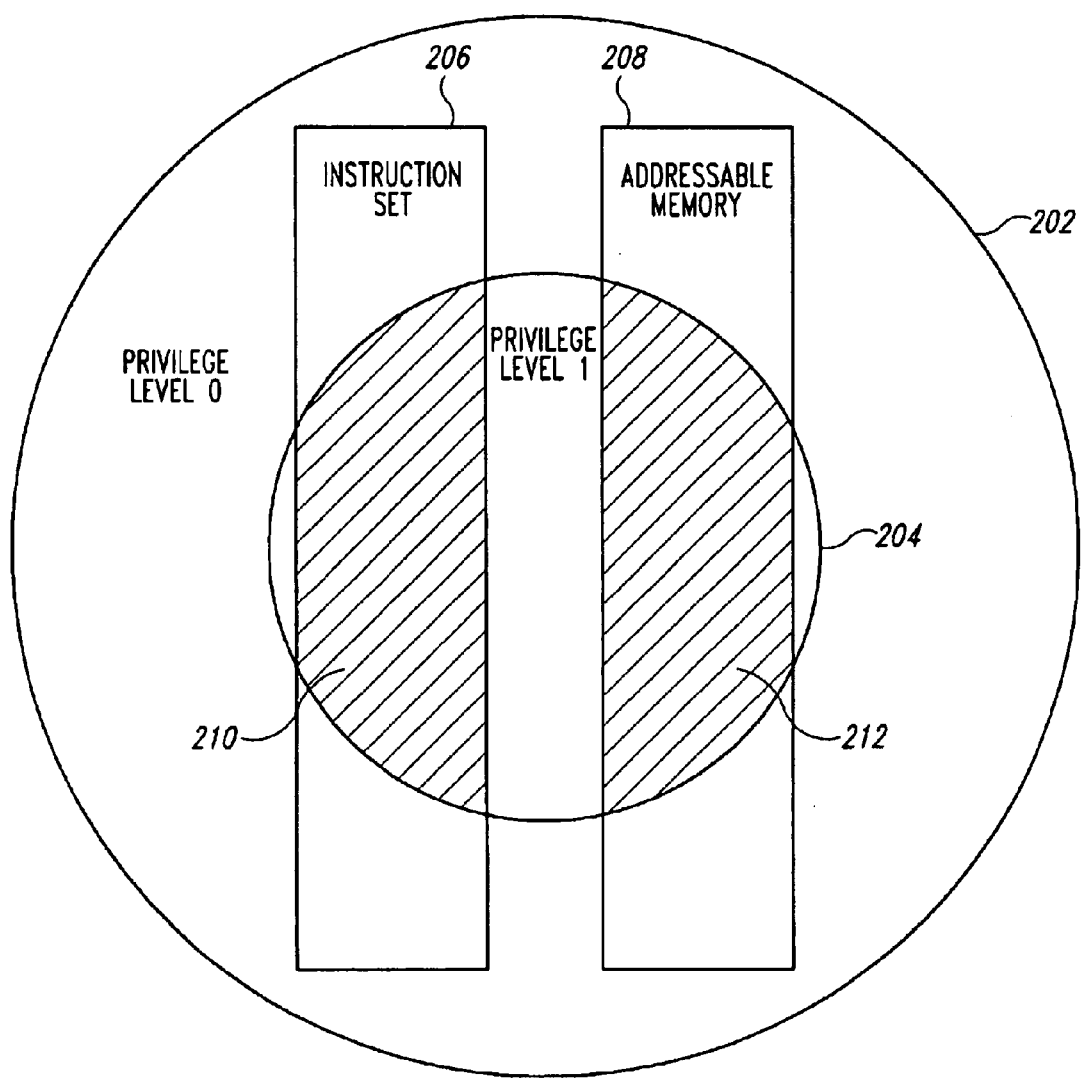
FIG. 2 illustrates the concept of privilege within a traditional computer system, such as that shown in FIG. 1.
Figure 3:
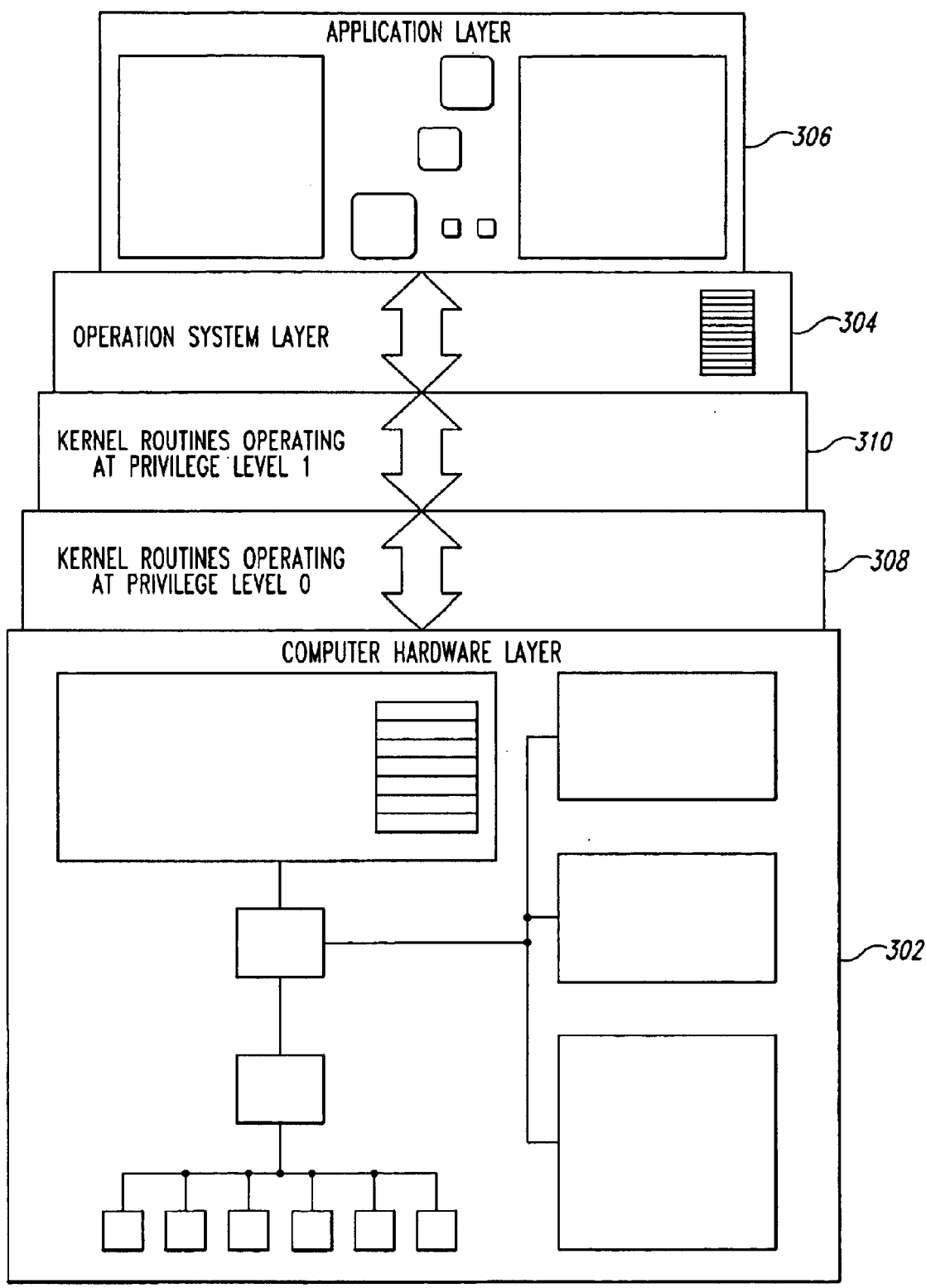
FIG. 3 shows logical layers within a modern, 4-privilege-level computer system.
Figure 4:
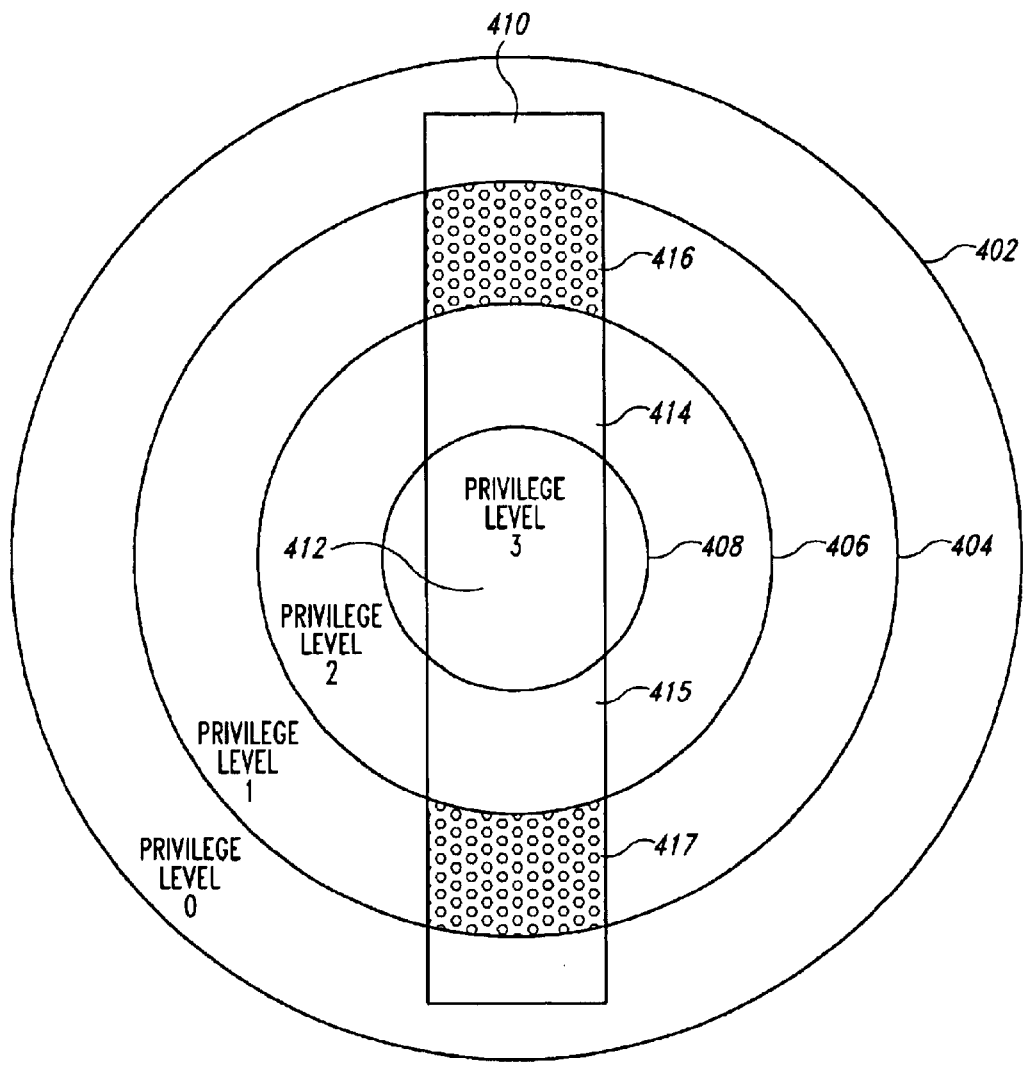
FIG. 4 illustrates partitioning of memory resources between privilege levels in certain 4-privilege-level computer systems.
Figure 7:
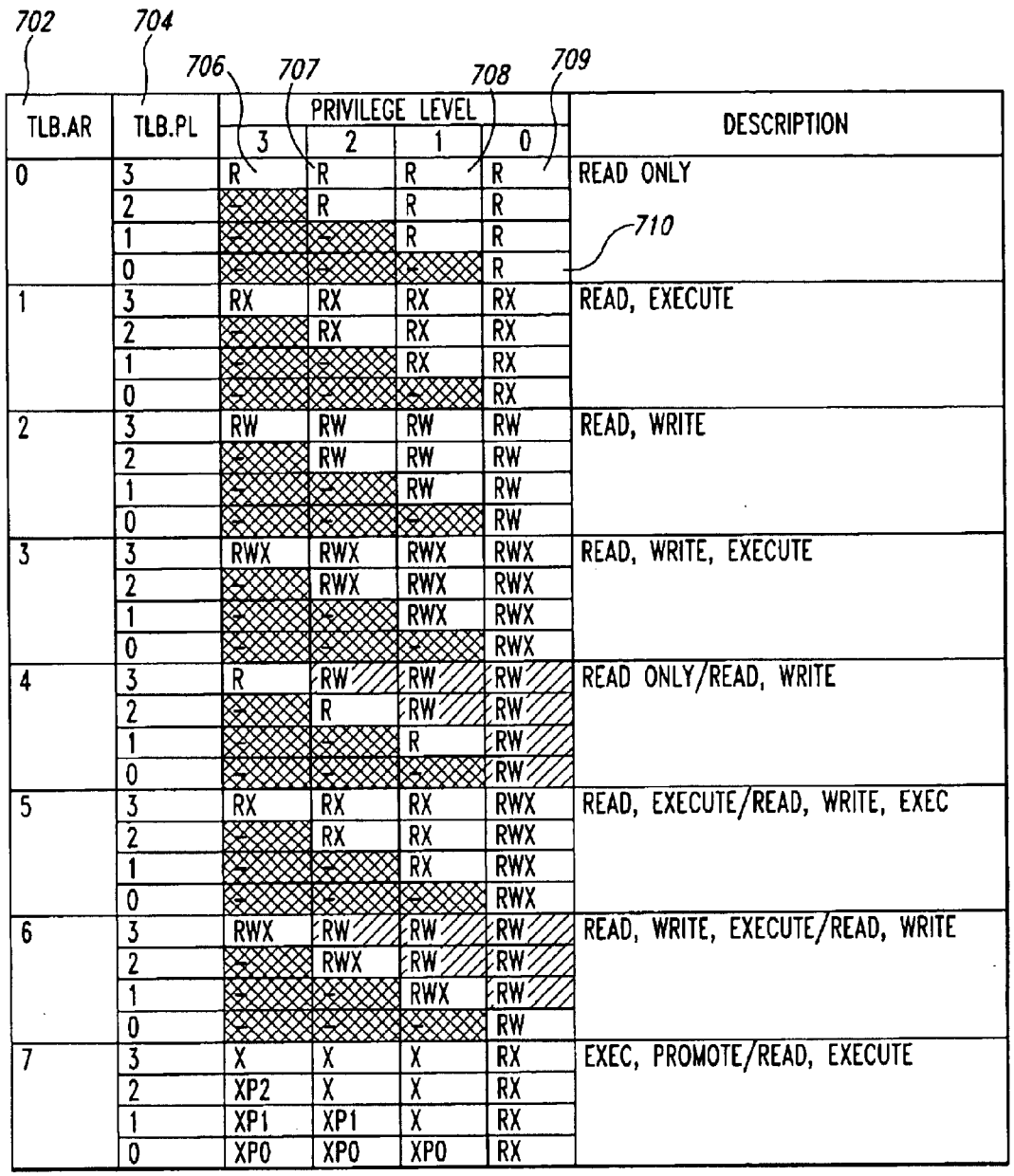
FIG. 7 shows the access rights encoding used in a TLB entry.

FIG. 7 shows the access rights encoding used in a TLB entry. Access rights comprise a 3-bit TLB.ar mode field 702 that specifies read, write, execute, and combination access rights, and a 2-bit TLB.pl privilege level field 704 that specifies the privilege level associated with a memory page. In FIG. 7, the access rights for each possible value contained within the TLB.ar and TLB.pl fields are shown. Note that the access rights depend on the privilege level at which a current process executes. Thus, for example, a memory page specified with a TLB entry with TLB.ar equal to 0 and TLB.pl equal to 3 can be accessed for reading by routines running at any privilege level, shown in FIG. 7 by the letter "R" in the column corresponding to each privilege level 706–709, while a memory page described by a TLB entry with TLB.ar equal to 0 and TLB.pl equal to 0 can be accessed by reading only by a process running at privilege level 0, as indicated in FIG. 7 by the letter "R" 710 under the column corresponding to privilege level 0. The access rights described in FIG. 7 nest by privilege level according to the previous discussion with reference to FIG. 4. In general, a process running at a particular privilege level may access a memory page associated with that privilege level and all lower privilege levels. Using only the access rights contained in a TLB entry, it is not possible to create a memory region accessible to a process running at level 3 and kernel routines running at level 0, but not accessible to an operating system routine running at privilege level 2. Any memory page accessible to a routine running at privilege level 3 is also accessible to an operating system routine executing at privilege level 2.

Figure 8:
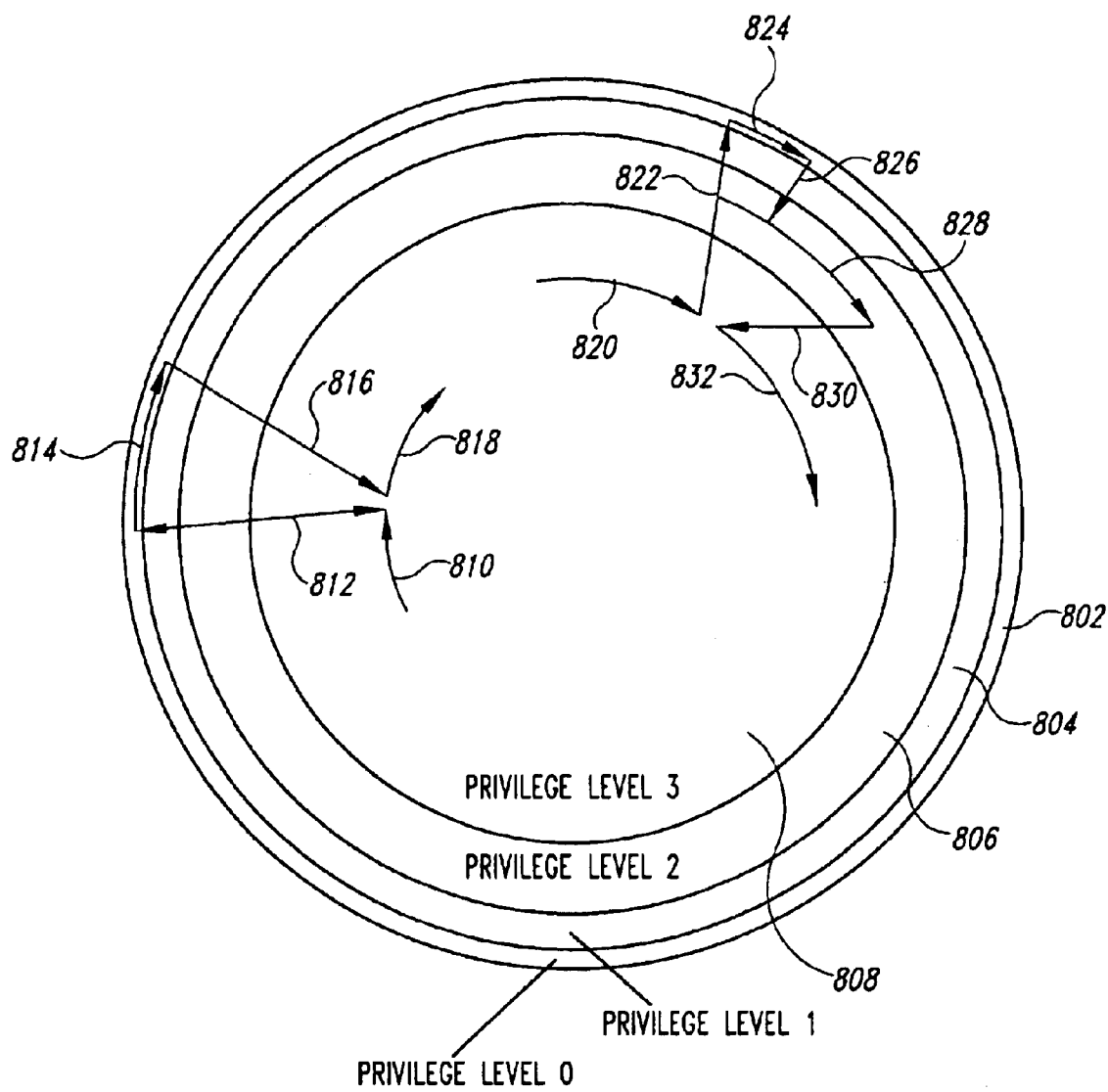
FIG. 8 illustrates privilege-level transitions during execution of a process.

FIG. 8 illustrates privilege-level transitions during execution of a process. In FIG. 8, the outer circular ring 802 corresponds to privilege level 0, the highest privilege level, and rings 804, 806, and 808 correspond to privilege levels 1, 2, and 3, respectively. FIG. 8 illustrates a brief snapshot, in time, during execution of two processes. A first process executes an application routine at privilege level 3 (810 in FIG. 8). The application routine makes a system call which promotes 812 the privilege level to privilege level 0, at which privilege level a kernel routine executes 814 in order to carry out the system call. When the kernel routine completes, the privilege level is demoted 816 back to privilege level 3, at which privilege level the application program continues executing 818 following return from the system call. For example, the application routine may make a system call to a kernel routine that generates an encryption key and stores the encryption key in private memory. A second application program also executes 820 at privilege level 3. During its execution, either the application program makes a call to an operating-system routine, or an external interrupt occurs, in either case promoting 822 the privilege level to privilege level 0. A dispatch routine executes for a short time 824 at privilege level 0 in order to dispatch execution to an operating system routine. The dispatch is accompanied by a privilege level demotion 826 to privilege level 2, at which privilege level the operating system routine executes 828 in order to carry out the operating-system call or service the interrupt. When the operating system routine completes, the privilege level is demoted 830 back to privilege level 3, at which privilege level the application program continues execution 832. Thus, in the multi-privilege-level computer system, the current privilege level ("CPL") can be promoted only via promotion to privilege level 0, either during a call to a system routine or as a result of an interrupt, fault, or trap.

Figure 9:
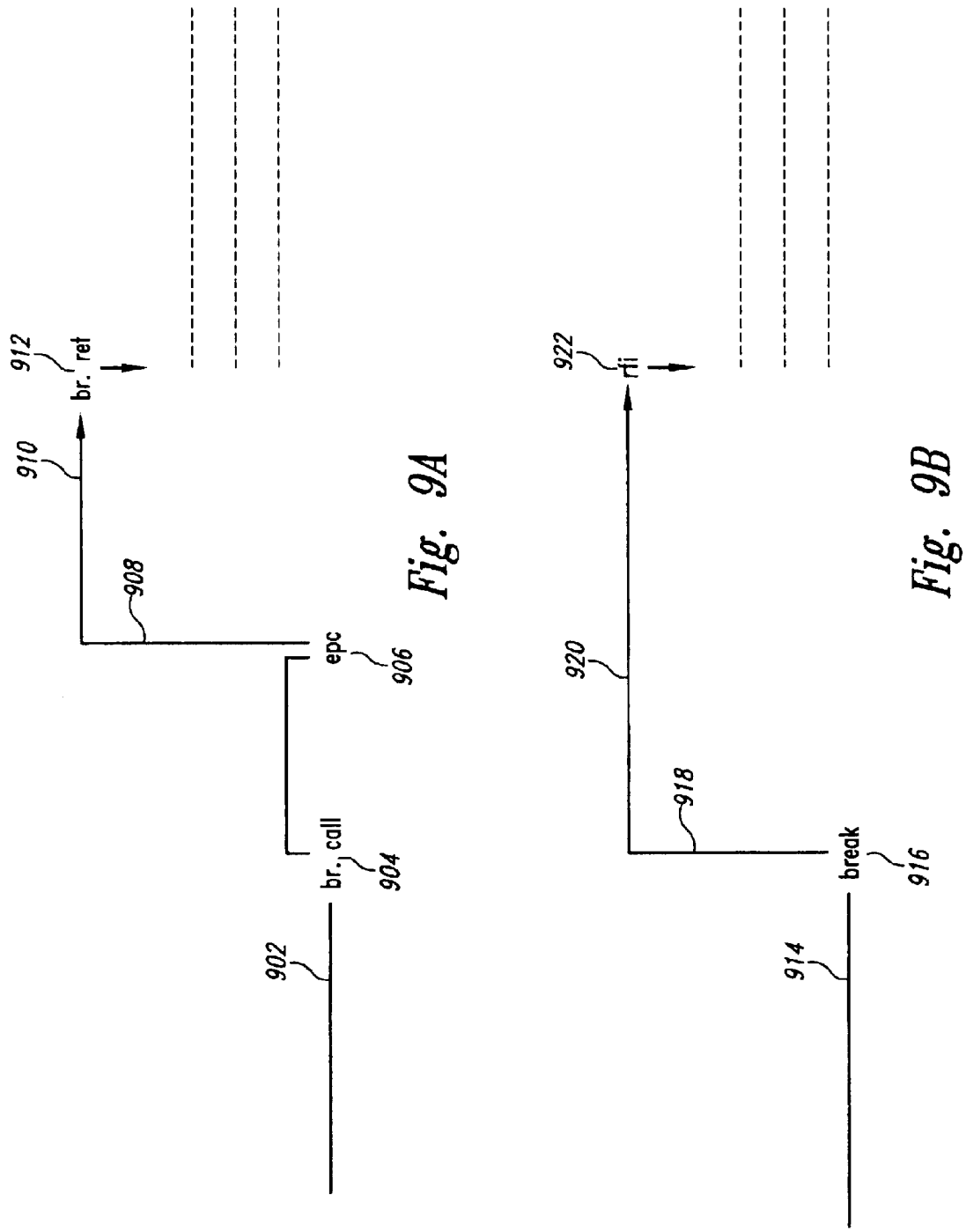
FIGS. 9A–B illustrate two different techniques by which CPL promotion occurs during system calls.

FIGS. 9A–B illustrate two different techniques by which CPL promotion occurs during system calls. In FIG. 9A, a program 902 executes at privilege level 3 up to execution of a br.call instruction 904. This is a branch instruction that branches to a memory page having execute and promote access rights for a process executing at privilege level 3. The values for the TLB access rights field for execute and promote access rights are shown in the last row in FIG. 7. The processor then retrieves and executes an epc 906 instruction from the memory page with execute and promote rights to promote 908 the privilege level to privilege level 0. Execution continues 910 at privilege level 0 until a br.ret instruction 912 is executed. This is a branch instruction that demotes the current privilege level to the previous privilege level stored in a PFS control register. By manipulating the PFS control register, the kernel routine executing at privilege level 0 can arrange for the br.ret instruction to demote the current privilege level to any of privilege levels 1–3. A second technique for privilege level promotion is shown in FIG. 9B. An application program executes 914 at privilege level 3 until a break instruction 916 is called. The break instruction generates a trap that results in promotion 918 of the current privilege level to privilege level 0. A kernel routine executes 920 at privilege level 0 until an rfi 922 instruction is called. The rfi instruction replaces the contents of the PSR control register with a saved, previous contents of the PSR bit register stored in control register IPSR. By manipulating the current privilege level field within the register, a kernel routine can arrange for CPL demotion as a result of the rfi instruction to any of privilege levels 1–3. External interrupts cause promotion of the CPL to privilege level 0, and the kernel level routine that is invoked by the attempt can dispatch an interrupt handling routine via execution of an rfi instruction, demoting the current privilege level to privilege level 2, at which privilege level operating system routines execute in order to handle the interrupt.

Figure 10:
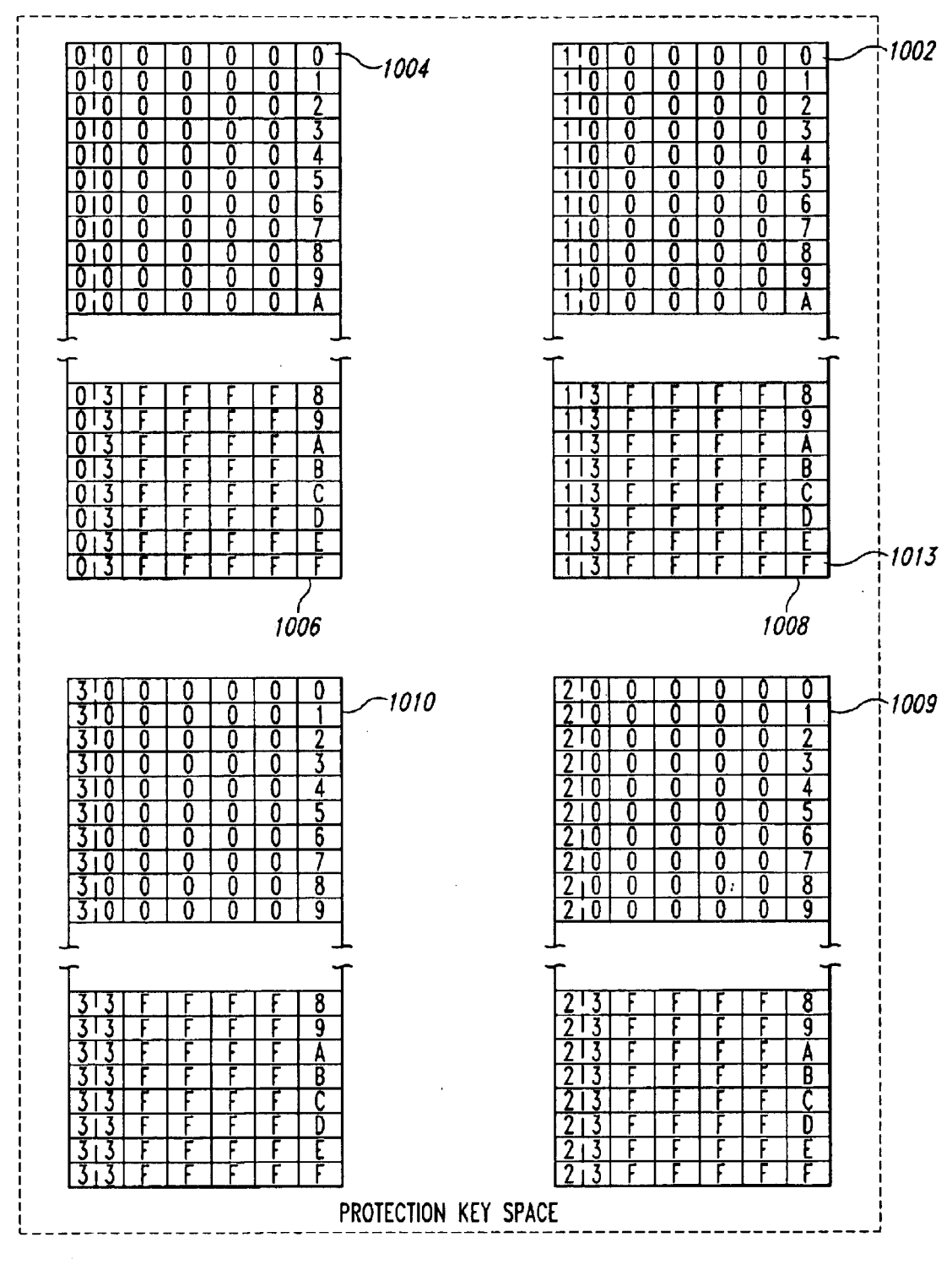

In order to provide a memory region that is accessible to routines executing at privilege level 0 and routines executing at any other one of privilege levels 1–3, the protection-key register and protection key field within TLB entries can be employed. As discussed above, protection keys are 24-bit values providing $2^{24}$ different protection keys. The kernel and global services routines can be written to partition the $2^{24}$ value protection key space into four different protection-key domains, each protection-key domain corresponding to a privilege level. FIG. 10 illustrates partitioning of the protection key space into four protection-key domains. The four protection-key domains 1006, 1008, 1009, and 1010 are represented in FIG. 10 as arrays of 24-bit protection-key values, with the first two, left-most columns 1002, 1003 each containing values representing two bits, and the remaining columns, starting with column 1005, each containing values representing four bits. In one method, illustrated in FIG. 10, the top two bits, for example bits of column 1002 in the protection key 1004, contain the value of the privilege level, and the remaining 22 bits of the protection key contain a unique protection-key value that can be assigned to a memory page accessed by a process running at the privilege level designated by the top two bits of the protection key. Thus, a first protection-key domain 1006 corresponding to privilege level 0 contains protection-key values ranging from 0 to 0x3FFFFF. A second protection-key domain 1008 corresponding to privilege level 1 contains protection-key values ranging from 0x400000 to 0x7FFFFF. Note that the values of the first two 2-bit fields "10" and "13" of protection-key values 1012 and 1013 result in the four-bit values "4" and "7" in the leading digits of the protection-key values 0x400000 and 0x7FFFFF, respectively, referred to above. A third protection-key domain 1009 corresponding to privilege level 2 contains privilege level values ranging from 0x800000 to 0xBFFFFF, and a fourth protection-key domain 1010 corresponding to privilege level 3 contains protection-key values ranging from 0xC00000 to 0xFFFFFF. During memory allocation, kernel routines assign protection keys to memory pages within the protection-key domains corresponding to the privilege levels associated with the memory pages. Kernel-privilege-level pages are associated with protection keys from protection-key domain 1006, operating-system-privilege-level memory pages are associated with protection keys selected from protection-key domain 1009, and application-privilege-level memory pages are associated with protection keys selected from protection-key domain 1010.

The protection-key-value space partitioning illustrated in FIG. 10 divides the entire protection-key-value space into four equal domains. In the case that fewer protection keys are needed for privilege-level-0 and privilege-level-1 memory pages, a different partitioning can be employed to create partition-key domains with unequal numbers of values, with the protection-key domains allocated for application-privilege-level memory pages containing a greater number of protection-key values than the protection-key domains allocated for privilege-level-0 memory pages.

Having partitioned the protection key space into separate protection-key domains, the kernel level routines can employ the hardware-protection-key mechanism discussed with reference to FIG. 5 in order to provide regions of memory comprising memory pages that can be accessed by kernel-privilege-level routines and by routines executing at one other privilege level. Each kernel level routine, other than the kernel-level protection-key fault handling routines, needs to invalidate all protection-key registers (534 in FIG. 5) prior to returning and demoting the CPL.

Figure 11A:
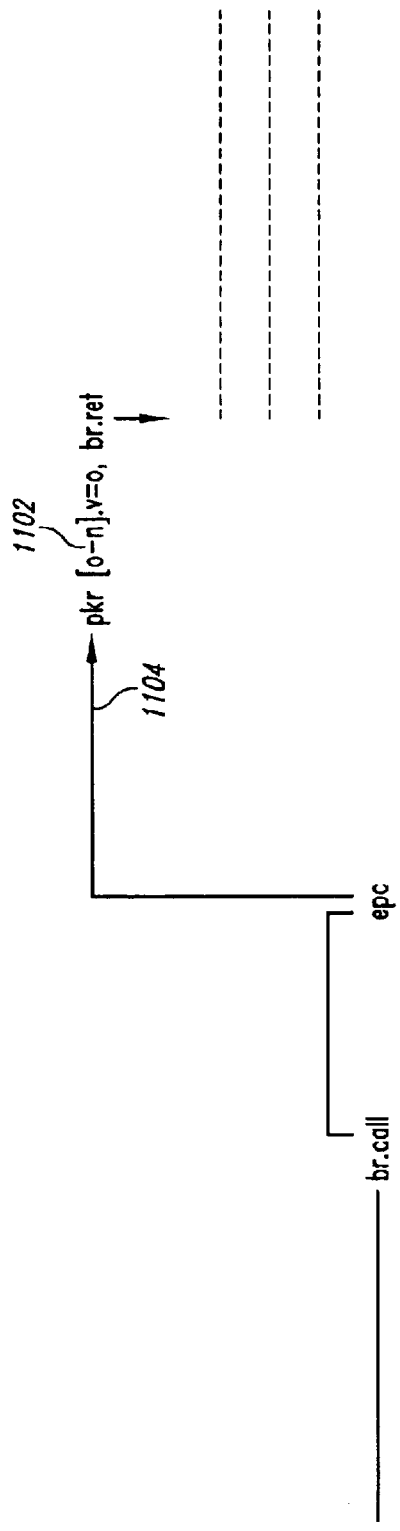
FIGS. 11A–B illustrate protection-key-register invalidation in the context of calls to kernel routines.
Figure 11B:
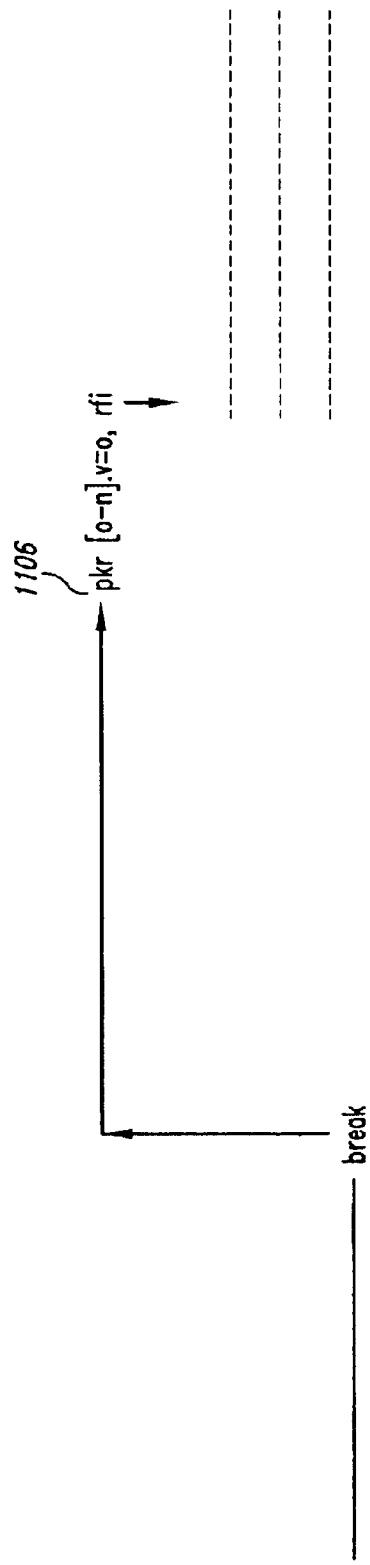

FIGS. 11A–B illustrate protection-key-register invalidation in the context of calls to kernel routines. FIG. 11A illustrates a kernel-routine call via br.call and epc instructions, using the same conventions as used in FIG. 9A. However, prior to calling the br.ret instruction 1102 to return from the kernel call and demote the CPL, the called kernel-privilege-level routine employs one of various instructions, such as a logical AND instruction, to clear the valid bits in all the protection-key registers 1104. Similarly, in FIG. 11B, which uses the same illustrative conventions as used in FIG. 9B, the valid bit of all protection-key registers is cleared 1106 prior to execution of the rfi instruction by the kernel routine in order to return from the system call and demote the CPL. Similarly, following execution of an interrupt dispatch routine, and prior to execution of the rfi instruction, the kernel-privilege-dispatch routine needs to clear the valid bit of all protection-key registers. By ensuring that the protection-key registers are invalidated prior to demotion of the CPL from privilege level 0, an operating system routine that executes following demotion of the CPL, such as execution of the operating system routine 828 in FIG. 8, will incur a protection-key fault upon attempting to access any memory page. Note that invalidating protection-key registers prior to CPL demotion from privilege level 0 is equivalent to invalidating protection-key registers prior to any increase in CPL, since increases in CPL always occur via a kernel-privilege-level routine. Note also that protection key invalidation may also be accomplished by inserting a selected NULL key value, such as 0, that can never be validly associated with a memory page into the protection-key register.

A protection-key fault is handled by kernel-privilege-level protection-key fault handlers. These handlers can ensure that only protection keys from the protection-key-domain associated with the operating-system-privilege level can be revalidated or inserted into the protection-key registers. Thus, although an operating-system routine may access an application-privilege-level memory page when the access mode for the memory page is compatible with the access attempted by the operating-system routine, the kernel protection-key-fault handler can ensure that the operating system may not access the memory page unless the kernel protection-key-fault routine elects to either validate the protection key corresponding to the memory page already within the protection-key registers (534 in FIG. 5) or insert a valid protection key entry into the protection-key registers corresponding to the protection key associated with the memory page. In many cases, it is desirable for the operating system to be able to access memory pages allocated to application programs executing on top of the operating system. However, in cases where an application routine desires to use a memory region accessible only to itself and to kernel-privilege-level routines, the kernel protection-key-fault handler does not allow the operating system access via the protection-key mechanism. The privilege-level-0 kernel can maintain a separate data structure to keep track of memory regions allocated for access by routines executing at only one additional privilege level in order to decide, during execution of the protection-key-fault handlers, whether or not to revalidate or insert a new protection key to allow higher-privilege-level routines to access memory pages with lower-privilege-level associations.

In an alternate embodiment, the protection-key space may be partitioned into separate partitions for each possible combination of shared access by routines running at different privilege levels. For example, one protection-key domain would be designated for memory errors to be shared by routines executing at kernel, operating-system, and application privilege levels. By using a fully partitioned partition key space, the kernel need not maintain a data structure designating whether or not a memory region has been allocated for access only by processes at two privilege levels. Instead, by assigning protection keys to memory pages at allocation time that support the desired accessibility, the protection-key-register invalidation technique ensures that only routines executing at privilege levels specified by the protection level associated with a memory page can access a given memory page.

Although the present invention has been described in terms of a particular embodiment, it is not intended that the invention be limited to this embodiment. Modifications within the spirit of the invention will be apparent to those skilled in the art. For example, as described above, many different protection key space partitionings may be employed to allocate protection keys for memory regions allocated for access by routines running at various different privilege-level combinations. Should protection-key-register invalidation prove inefficient when employed generally prior to CPL demotion from privilege-level 0, kernel-level routines may employ information stored in the PFS and IPSR control registers and other saved information to determine whether, following return from a kernel routine, the process that initially made a kernel routine call or that was interrupted by an external interrupt will resume execution at the privilege level that it was executing, or whether either the CPL will change or a different process will resume executing. The protection-key registers need be invalidated only in the latter case. In computer environments that offer alternative mechanisms, other than protection-key registers, for protecting memory, alternative schemes employing those mechanisms can be devised to ensure that memory access is provided only to routines running at those privilege levels at which a particular region of memory is intended for access. Note that, in the above discussion, memory access is described as being provided to processes, but that the term "process" is intended to generally stand for any executing entity within a computing environment, including execution threads and other types of executing entities.

The foregoing description, for purposes of explanation, used specific nomenclature to providing a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for providing access to memory within a computer system to processes that execute at a current privilege level having a value selected from one of a number of different privilege level values ranging from a highest privilege level to a lowest privilege level, the method comprising:

associating protection-key values with specific privilege levels;

invalidating protection-key registers when the current privilege level is demoted from the highest privilege level other than during return from a protection-key-fault-handling routine and re-validating an invalidated protection-key register to contain a particular protection-key value during handling of a protection-key fault only when the privilege level of the process that will resume execution following handling of the protection-key fault is a privilege level associated with the particular protection-key value.

2. The method of claim 1 wherein invalidating protection-key registers when the current privilege level is demoted from the highest privilege level further comprises, when the current privilege level is demoted from the highest privilege level, invalidating each protection-key register by one of:

clearing a valid bit within the protection-key register; and writing a null protection-key value into the protection-key register.

3. The method of claim 1 wherein invalidating protection-key registers when the current privilege level is demoted from the highest privilege level further comprises, when the current privilege level is demoted from the highest privilege level to a privilege level different from a previous privilege level stored in a control register, invalidating each protection-key register by one of:

clearing a valid bit within the protection-key register; and writing a null protection-key value into the protection-key register.

4. The method of claim 1 wherein re-validating an invalidated protection-key register to contain a particular protection-key value further comprises re-validating the protection-key register by one of:

setting a valid bit within a protection-key register containing a particular protection-key value; and inserting the particular protection-key value into a protection-key register.

5. The method of claim 1 wherein associating protection-key values with specific privilege levels further comprises:

partitioning protection-key values into a number of domains, each domain corresponding to access by processes executing at specific privilege levels.

6. The method of claim 5 wherein re-validating an invalidated protection-key register to contain a particular protection-key value during a protection-key fault only when the privilege level of the process that will resume execution following handling of the protection-key fault is a privilege level associated with the particular protection-key value further comprises:

re-validating the invalidated protection-key register containing a particular protection-key value during a protection-key fault only when the privilege level of the process that will resume execution following handling of the protection-key fault is a privilege level corresponding to the protection-key domain that includes the particular protection-key value.

7. Computer instructions for carrying out the method of claim 1 for providing access to memory within a computer system encoded by a technique selected from among:

encoding the instructions in a computer-readable storage medium;

encoding the instructions as electronic signals for transmission via an electronic communications medium; and printing the results in a human-readable format.

8. A computer system that provides access to memory within the computer system to processes that execute at a current privilege level having a value selected from one of a number of different privilege level values ranging from a highest privilege level to a lowest privilege level, the system comprising:

protection-key values associated with specific privilege levels as well as with memory regions;

protection-key registers; and kernel routines that run at the highest privilege level that invalidate protection-key registers when the current privilege level is demoted from the highest privilege level and that re-validate a protection-key register to contain a particular protection-key value during a protection-key fault only when the privilege level of the process that will resume execution following handling of the protection-key fault is a privilege level associated with the particular protection-key value.

9. The system of claim 8 wherein the kernel routines invalidate a protection-key register when the current privilege level is demoted from the highest privilege level by one of:

clearing a valid bit within the protection-key register; and writing a null protection-key value into the protection-key register.

10. The system of claim 8 wherein the kernel routines invalidate protection-key registers when the current privilege level is demoted from the highest privilege level to a privilege level different from a previous privilege level stored in a control register.

11. The system of claim 8 wherein the kernel routines re-validate an invalidated protection-key register to contain a particular protection-key value by one of:
   setting a valid bit within a protection-key register containing a particular protection-key value; and
   inserting the particular protection-key value into a protection-key register.

12. The system of claim 8 wherein protection-key values are associated with specific privilege levels by partitioning protection-key values into a number of domains by kernel routines, each domain corresponding to access by processes executing at specific privilege levels.

13. The system of claim 12 wherein the kernel routines re-validate an invalidated protection-key register to contain a particular protection-key value during a protection-key fault only when the privilege level of the process that will resume execution following handling of the protection-key fault is a privilege level corresponding to the protection-key domain that includes the particular protection-key value.

14. A computer system that provides access to memory within the computer system to a process depending on the privilege level at which the process executes, privilege levels ranging from a lowest privilege level to a highest privilege level, the system comprising:
   a means for associating protection-key values both with specific privilege levels as well as with memory regions;
   a means for requiring an executing process to have obtained the protection key associated with a memory region prior to accessing the memory region;
   a means for providing a protection key only to a process that is executing at a current privilege level that is associated with the protection key; and
   a means for ensuring that, when a current privilege level within the computer system changes, protection keys are relinquished by all currently executing processes.

15. The computer system of claim 14 wherein the means for associating protection-key values both with specific privilege levels as well as with memory regions further includes partitioning protection-key values into domains, each domain associated with one or more privilege levels.

16. The computer system of claim 14 wherein the means for requiring an executing process to have obtained the protection-key associated with a memory region prior to accessing the memory region further includes protection-key registers and a protection-key-fault handling mechanism.

17. The computer system of claim 16 wherein the means for providing a protection key only to a process that is executing at a current privilege level that is associated with the protection key further includes, during protection-key fault handling, only validating a protection-key register containing a protection-key value, or inserting a protection-key value into a protection-key register, for a process executing at a current privilege level associated with the protection-key value.

18. The computer system of claim 16 wherein the means for ensuring that, when a current privilege level within the computer system changes, protection keys are relinquished by all currently executing processes, further includes kernel routines, other than protection-key fault handling routines, that run at the highest privilege level and that invalidate protection-key registers when the current privilege level is demoted from the highest privilege level.

* * * * *